United States Patent
Perron

(10) Patent No.: US 9,483,274 B1
(45) Date of Patent: *Nov. 1, 2016

(54) METHOD OF SPLITTING REGISTER LIVE RANGES

(71) Applicant: International Business Machines Corporation, Armonk, NY (US)

(72) Inventor: Steven J. Perron, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/163,759

(22) Filed: May 25, 2016

Related U.S. Application Data

(63) Continuation of application No. 14/970,572, filed on Dec. 16, 2015, which is a continuation of application No. 14/838,457, filed on Aug. 28, 2015.

(51) Int. Cl.
*G06F 9/45* (2006.01)
*G06F 9/38* (2006.01)
*G06F 9/30* (2006.01)

(52) U.S. Cl.
CPC .............. *G06F 9/384* (2013.01); *G06F 8/441* (2013.01); *G06F 8/4435* (2013.01); *G06F 9/30098* (2013.01)

(58) Field of Classification Search
None
See application file for complete search history.

(56) References Cited

U.S. PATENT DOCUMENTS

| | | |
|---|---|---|
| 4,571,678 A | 2/1986 | Chaitin |
| 5,418,958 A | 5/1995 | Goebel |
| 5,418,959 A | 5/1995 | Smith et al. |
| 5,659,754 A | 8/1997 | Grove et al. |
| 5,774,730 A | 6/1998 | Aizikowitz et al. |
| 5,946,491 A | 8/1999 | Aizikowitz et al. |
| 6,090,156 A | 7/2000 | MacLeod |
| 6,427,234 B1 | 7/2002 | Chambers et al. |
| 6,523,173 B1 | 2/2003 | Bergner et al. |
| 8,266,603 B2 | 9/2012 | Inagaki et al. |
| 8,555,035 B1 | 10/2013 | Patney et al. |
| 8,832,671 B1 | 9/2014 | Patney et al. |
| 8,893,095 B2 | 11/2014 | Gschwind et al. |
| 2002/0095668 A1 | 7/2002 | Koseiki et al. |
| 2004/0221280 A1 | 11/2004 | Boulton et al. |
| 2007/0038984 A1 | 2/2007 | Gschwind et al. |
| 2007/0256066 A1 | 11/2007 | Nakaike et al. |
| 2008/0215856 A1 | 9/2008 | Gschwind et al. |

(Continued)

OTHER PUBLICATIONS

Nakaike et al., "Profile-Based Global Live-Range Splitting," Copyright © 2006 ACM.*

(Continued)

*Primary Examiner* — Insun Kang
(74) *Attorney, Agent, or Firm* — James H. Mayfield

(57) ABSTRACT

A computer program product for splitting live register ranges includes a computer readable storage medium and program instructions stored on the computer readable storage medium, the program instructions include instructions for identifying one or more H pathways comprising one or more H nodes having high register pressure using a backwards data flow in the graph, identifying an L pathway consisting of two or more L nodes using a depth first search, and inserting register splitting instructions for each symbolic register that is live in both the one or more H pathways and the L pathway. The register splitting instructions are inserted at a starting node of the one or more H pathways. Register merging instructions are inserted at an ending node of the one or more H pathways.

1 Claim, 4 Drawing Sheets

(56) References Cited

U.S. PATENT DOCUMENTS

| | | |
|---|---|---|
| 2010/0199270 A1 | 8/2010 | Baev |
| 2011/0138372 A1 | 6/2011 | Damron |
| 2012/0254845 A1 | 10/2012 | Yi et al. |
| 2012/0297373 A1 | 11/2012 | Gschwind et al. |
| 2014/0164745 A1 | 6/2014 | Mehrara et al. |
| 2015/0193234 A1 | 7/2015 | Udayakumaran et al. |

OTHER PUBLICATIONS

Cooper et al., "Live Range Splitting in a Graph Coloring Register Allocator*", Rice University, Houston, Texas, USA, Trilogy Development Group, Austin, Texas, USA, printed on May 24, 2016, 14 pages.

Braun et al., "Register Spilling and Live-Range Splitting for SSA-Form Programs", O. de Moor and M. Schwartzbach (Eds.): CC 2009, LNCS 5501, pp. 174-189, 2009, © Springer-Verlag Berlin Heidelberg 2009.

Briggs, Preston, "Register Allocation via Graph Coloring", Thesis, Rice University, Houston, Texas, Apr. 1992, pp. 1-154.

IBM, "IBM XL C/C++ for Linux, V13.1.1 adds an additional compiler for little endian Linux distributions", IBM United States Software Announcement, 214-411, dated Oct. 6, 2014, IBM®, pp. 1-17, Grace Period Disclosure, <http://www-01.ibm.com/common/ssi/cgi-bin/ssialias?subtype=ca&infotype=an&appname=iSource&supplier=897&letternum=ENUS214-411>.

Wimmer, et al., "Optimized Interval Splitting in a Linear Scan Register Allocator*", VEE'05, Jun. 11-12, 2005, Chicago, Illinois, USA, Copyright 2005 ACM 1-59593-047-7/05/0006, pp. 132-141.

Perron, Steven J., "Method of Splitting Register Live Ranges", U.S. Appl. No. 14/838,457, filed Aug. 28, 2015, 26 pages.

Perron, Steven J., "Method of Splitting Register Live Ranges", U.S. Appl. No. 14/970,572, filed Dec. 16, 2015, 22 pages.

IBM Appendix P, list of patents and patent applications treated as related, Jun. 20, 2016, 2 pages.

Cooper et al., "Live Range Splitting in a Graph Coloring Register Allocator*", Rice University, Houston Texas, USA, Trilogy Development Group Austin, Texas, USA, printed on Dec. 2, 2015, 14 pages.

Blazy et al., "Live-range Unsplitting for Faster Optimal Coalescing", Oct. 13, 2008, 16 pages.

Briggs et al., "Coloring Heuristics for Register Allocation", Copyright 20013 ACM, 12 pages.

Briggs et al., "Improvements to Graph Coloring Register Allocation", ACM Transactions on Programming Language and Systems, vol. 16, No. 3, May 1994, 26 pages.

Chow et al., "Register Allocation by Priority-based Coloring", Copyright 2003, ACM, 13 pages.

Grund et al., "A Fast Cutting-Plane Algorithm for Optimal Coalescing", Feb. 28, 2007, 15 pages.

Odaira et al., "Coloring-based Coalescing for Graph Coloring Register Allocation", CGO'10 Apr. 24-28, 2010, Toronto, Ontario, Canada, Copyright © ACM, 10 pages.

* cited by examiner

METHOD OF SPLITTING REGISTER LIVE RANGES

STATEMENT REGARDING PRIOR DISCLOSURES BY THE INVENTOR OR A JOINT INVENTOR

The following disclosure(s) are submitted under 35 U.S.C. 102(b)(1)(A) as prior disclosures by, or on behalf of, a sole inventor of the present application or a joint inventor of the present application:

(1) IBM XL C/C++ for Linux, V 13.1.1 adds an additional compiler for little endian Linux distributions, IBM, Oct. 6, 2014, http://www-01.ibm.com/common/ssi/cgi-bin/ssialias?infotype=
an&subtype=ca&appname=gpateam&supplier=
877&lettemum=ENUSZP14-0521.

BACKGROUND OF THE INVENTION

The present invention relates generally to software compilers, and more specifically, to register allocation.

Two types of registers that are relevant to the field of software compiling are hardware registers and symbolic registers. Hardware registers store bits of information and are often tightly coupled to CPUs and referenced in software instructions. Hardware registers are physical entities, and as such a system is provided with a finite number of hardware registers. Symbolic registers, on the other hand, are virtual registers located in memory, and thus may be potentially limitless in number. Register assignment occurs when symbolic registers are assigned to the hardware registers on a system. One problem area in register assignment occurs when a program's demand for symbolic registers exceeds the number of hardware registers available.

SUMMARY

As disclosed herein, a computer program product for splitting live register ranges includes a computer readable storage medium and program instructions stored on the computer readable storage medium, the program instructions include instructions for identifying one or more H pathways comprising one or more H nodes having high register pressure using a backwards data flow in the graph, identifying an L pathway consisting of two or more L nodes using a depth first search, and inserting register splitting instructions for each symbolic register that is live in both the one or more H pathways and the L pathway. The register splitting instructions are inserted at a starting node of the one or more H pathways. Register merging instructions are inserted at an ending node of the one or more H pathways.

DETAILED DESCRIPTION

Figure 1:
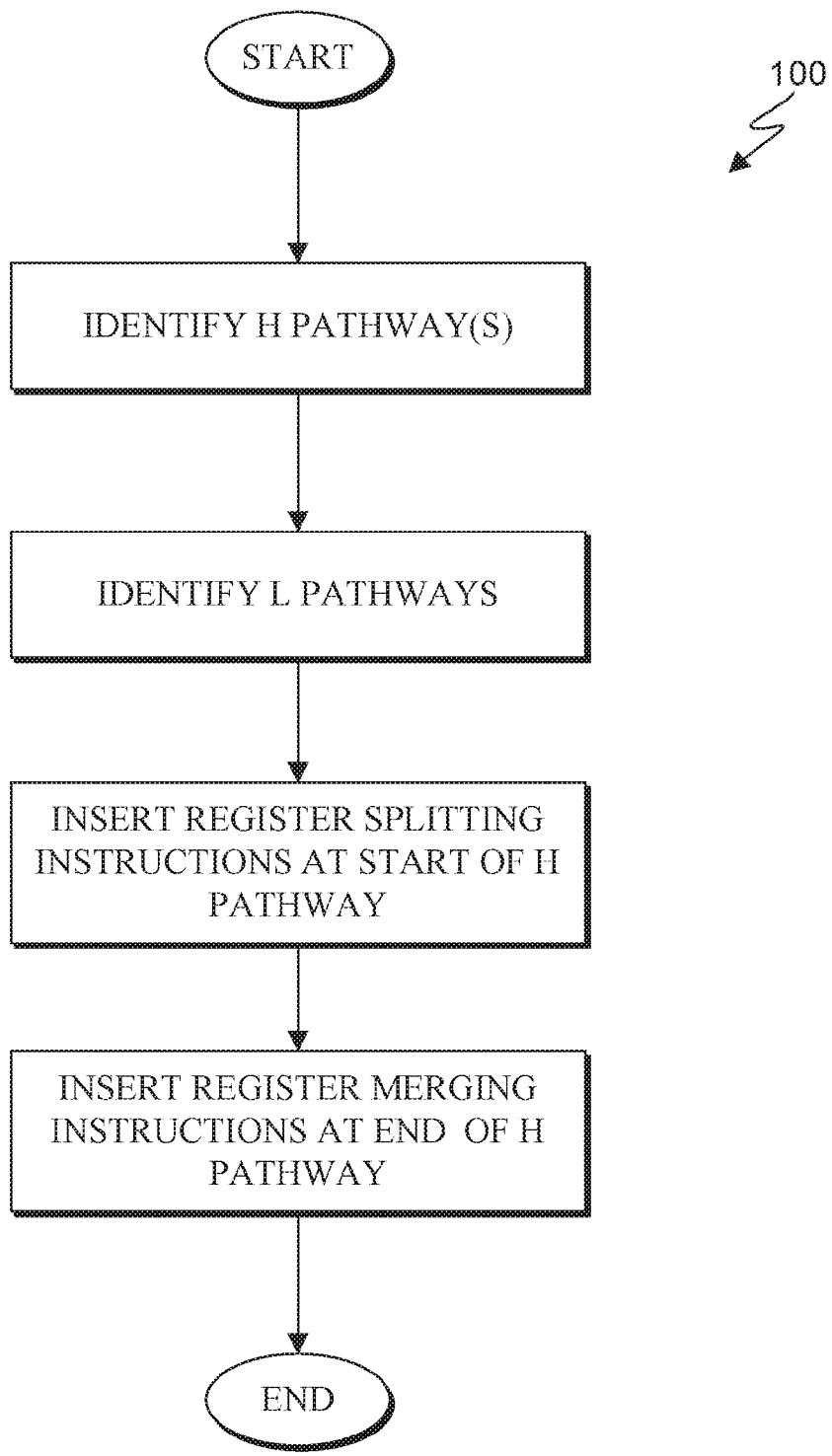
FIG. 1 is a flowchart depicting one embodiment of a register range splitting method in accordance with the present invention.

Embodiments of the present invention relate generally to software compilers, and in particular, to register allocation. Register assignment occurs when symbolic registers are assigned to the hardware registers on a computing system. Sometimes a program may require a certain number of symbolic registers in order to complete an operation, but this number surpasses the number of hardware registers currently available for allocation. When this happens, it is necessary to spill the symbolic registers that have been assigned to hardware registers but are not currently being used in the operation. Spilling these unused symbolic registers may then free up hardware registers for the software registers that are being used.

When an area of code has a demand for symbolic registers that exceeds the number of hardware registers, that area of code may be said to have high register pressure; likewise, when an area of code has enough hardware registers available to it, that area of code has low register pressure. When a symbolic register is used in several high register pressure regions, the symbolic register may need to be spilled between each use. On the other hand, when a symbolic register is used in several low register pressure regions, the symbolic register does not necessarily need to be spilled between each use. In the case that a symbolic register is used in several locations that include both high and low register pressure regions, the fact that even one region has high register pressure "overrides" the low register regions, necessitating the symbolic register to be spilled between each use.

Conventionally, the instructions to spill symbolic registers are referred to as spill code, and may be placed in sub-optimal locations within a program's code. Since spilling a symbolic register represents a memory operation, reducing the number of spill operations may prove to be a means of optimizing a program. Embodiments of the present invention may address this issue by splitting the ranges in which a register is live, so that the same register is no longer used in both high and low register pressure regions.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter. The present invention will now be described in detail with reference to the figures.

FIG. 1 is a flowchart depicting one embodiment of a register range splitting method 100 in accordance with the present invention. As depicted, the register range splitting method 100 includes identifying (110) H pathways, identifying (120) L pathways, inserting (130) register splitting instructions, and inserting (140) register merging instructions. The register range splitting method 100 splits the original range of a symbolic register r into two ranges: one range for register r that has low register pressure, and one range for the new symbolic register r', which has high register pressure. Splitting the live ranges of registers in this manner may ensure that no spill code will need to be executed when following a path with low register pressure.

Identifying (110) H pathways may include identifying one or more pathways in a program that have high register pressure. A program can be represented as a reduced control-flow graph, which is a series of nodes connected to each other. In a reduced control-flow graph, all of the sub-loops of a portion of code may be reduced to a single entity known as a basic block or a node. A pathway may thus be defined as a sequence of nodes. A pathway may run the length of a program if it begins at the program's entry node and ends at the exit node.

An H pathway is a pathway in which some or all of the nodes have high register pressure. In some embodiments, register pressure is considered high for a node when the amount of symbolic registers used by the node exceed the number of hardware registers physically present in the processor executing the program. When there are disjoined register types, such as general purpose registers and float point registers, register pressure may be tracked separately for each register type.

To identify an H pathway, first a backwards data flow may be performed on the control-flow graph. Working backwards on the graph, symbolic registers may be identified as live at the end of each node in which the registers are used. Since this is a backwards data flow, a symbolic register may be flagged as dead once it is first defined, as it cannot exist in code prior to its definition. Whenever the number of live symbolic registers exceeds the number of hardware registers at a node, that node may be denoted as having high register pressure, and may be referred to as an H node. In some embodiments, the number of live registers at a node is compared to the maximum number of live registers found so far in the analysis, and if that number exceeds the maximum, then the maximum is updated to reflect this new number of live registers. A pathway may thus be determined to be an H pathway if it contains any H nodes.

Identifying (120) L pathways may include performing an analysis over the entire code of a program to discover pathways having low register pressure. An L pathway may be defined as a pathway of nodes in which every node is an L node, meaning that it has low register pressure. Thus, while an H pathway may contain either all H nodes or a combination of H and L nodes, an L pathway in contrast may be strictly limited to being a series of L nodes. In some embodiments, L pathways are identified using a simple depth first search, as described in greater detail with regard to FIG. 2.

Inserting (130) register splitting instructions may include creating for each symbolic register r a new symbolic register, r', that will be used in an H pathway wherever r would normally be used. The register move from r to r' may occur when an r' is created, the information that is stored in r is stored in r', and references to r are replaced by r' in the H pathway. Thus, at compilation the live range for the symbolic register r is split: r may be live only in the L pathways, and r' may be live in the H pathways. Splitting the live range of r may optimize the compiled program because r will no longer have to be spilled after use in each L node. In some embodiments, the register move from r to r' may be inserted at the first node in the H pathway. In other embodiments, the register move from r to r' may be inserted in the last node that is immediately before the H pathway.

Inserting (140) register merging instructions may include merging the symbolic register r' back to r after an H pathway. In some embodiments, the register merge from r' to r occurs at the last node belonging to an H pathway. In other embodiments, the register move may occur at the first node immediately after the H pathway.

Figure 2:
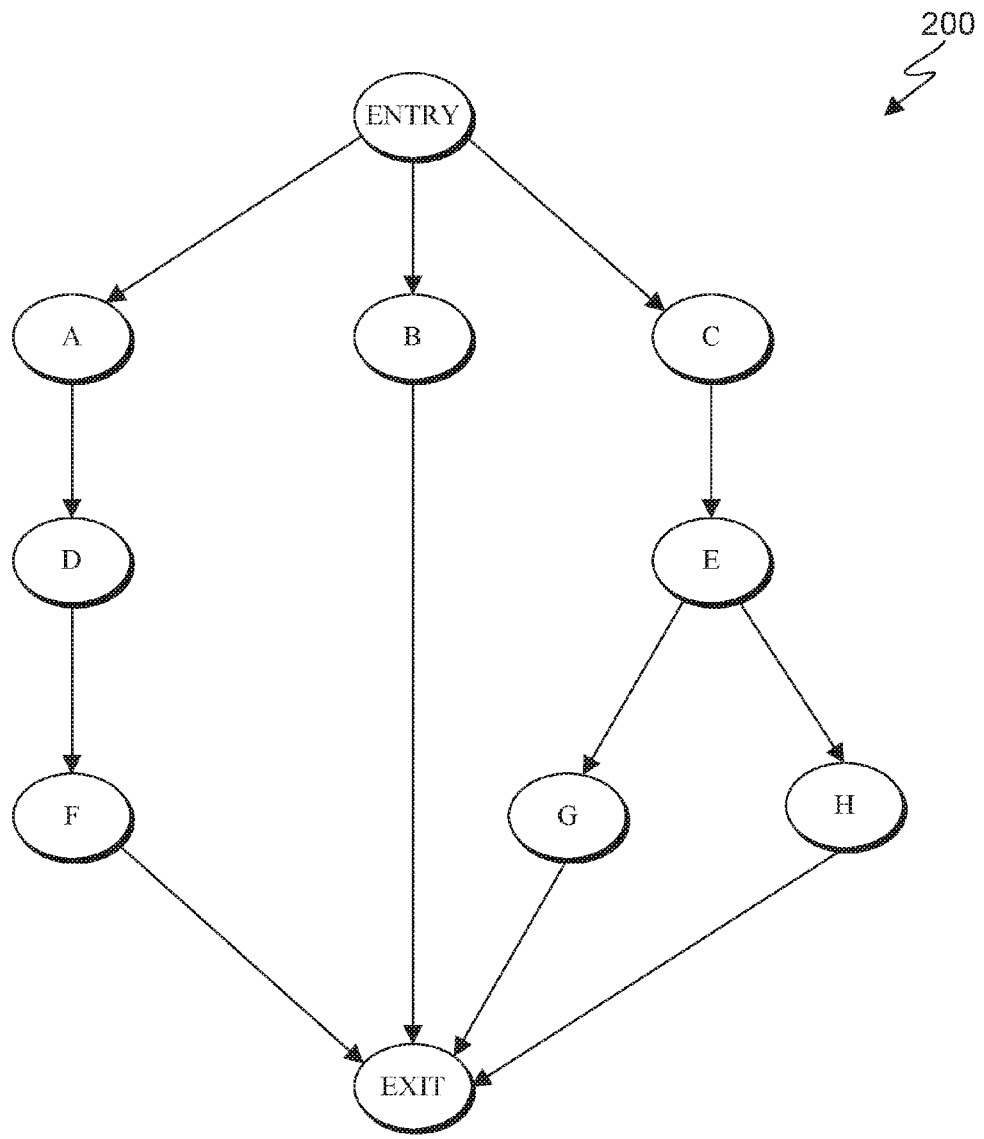
FIG. 2 depicts an example of one embodiment of a depth-first search in accordance with the present invention.

FIG. 2 depicts an example 200 of one embodiment of a depth-first search in accordance with the present invention. As depicted, the example 200 includes an entry node, an exit node, and eight nodes labeled A through H. The arrows between each node may be referred to as edges and represent the flow of execution of the program represented by example 200. The entire program may be systematically analyzed on a node-by-node basis by performing a depth-first search.

A depth-first search may start at the entry node and proceed as far down a pathway as possible until it reaches the exit node, at which point the depth-first search reverses direction until it arrives at a branching point and follows the next pathway down. In some embodiments, a depth-first search has a left-edge preference, meaning that when it arrives at a branch, it will proceed down the leftmost direction before returning to the branch and working its way to the right. Alternatively, in other embodiments a depth-first search may have a right-edge preference. At every node, the depth-first search may determine whether the node has high or low register pressure.

Assuming a left-edge preference, in this example 200 the depth-first search would proceed to A, then D, then F, and then the exit node, whereupon the depth-first search would back up to B. From B, the search would reach the exit node and then back up to B again. Finally, the depth-first search would proceed to C, then E, then G and the exit node, backing up to E, and then proceeding to H and the exit node, at which point the search is finished. In this example, the sequence is A-D-F-B-C-E-G-H. Assuming instead that the depth-first search has a right-edge preference, the order would be C-E-H-G-B-A-D-F. Thus, a depth-first search may be used to systematically search every node in order to discover a sequence of L nodes and thus label the sequence as an L pathway.

In another embodiment, the depth-first search runs as a post-order search that starts at the exit node. The order in which the nodes may be processed in a post-order depth-first search is F-D-A-B-G-H-E-C, or, with the other handedness preference, H-G-E-C-B-F-D-A.

Figure 3:
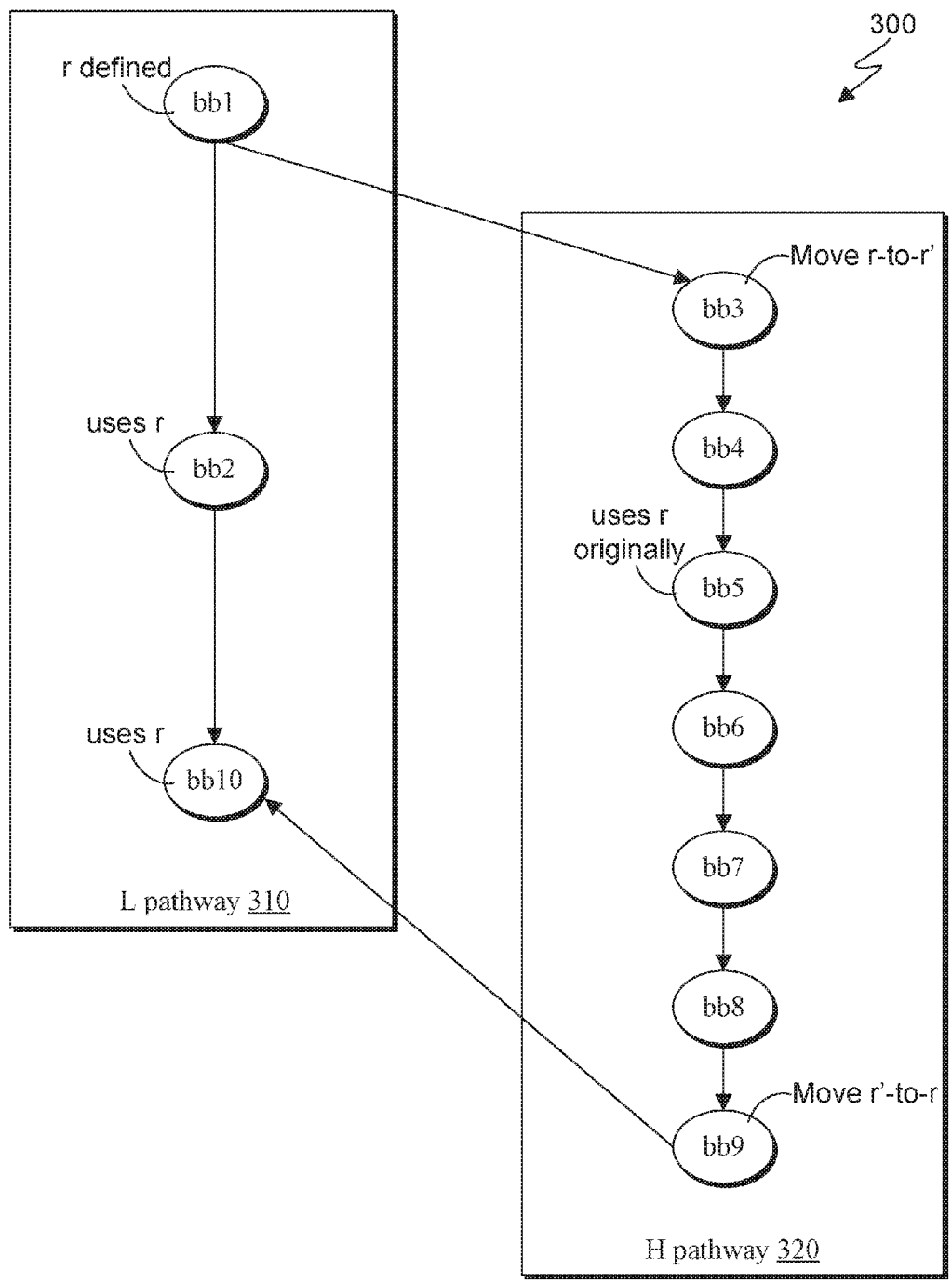
FIG. 3 depicts an example of one embodiment of a reduced control-flow graph in accordance with the present invention.

FIG. 3 depicts an example 300 of one embodiment of a reduced control-flow graph in accordance with the present invention. As depicted, the example 300 includes L pathway 310, H pathway 320, an entry node/basic block bb1, an exit node/basic block bb10, and intermediate nodes bb2-bb9. L pathway 310 contains L nodes bb1, bb2, and bb10. H pathway 320 contains nodes bb3 through bb9 (at least one of these nodes is an H node). In this example 300, a symbolic register r is defined at bb1, and used in bb2, bb5, and bb10.

By applying register range splitting method 100, the live range of r has been split in this example 300 as follows: symbolic register r is used in the nodes of the L pathway 310, and symbolic register r' is used in the H pathway 320. Thus, where a program's code originally used r at bb5, it instead will use r'. In some embodiments, r' is converted back to r by adding a reverse register move at bb9 at the end of H pathway 320. Thus, now that the live range of r is split, there may no longer be a need to provide spill code for r at bb1, bb2, and/or bb10. In the depicted example, spill code may still be required for r' at bb5, as r' is live from bb3 to bb9 and some or all of these nodes may be H nodes.

Figure 4:
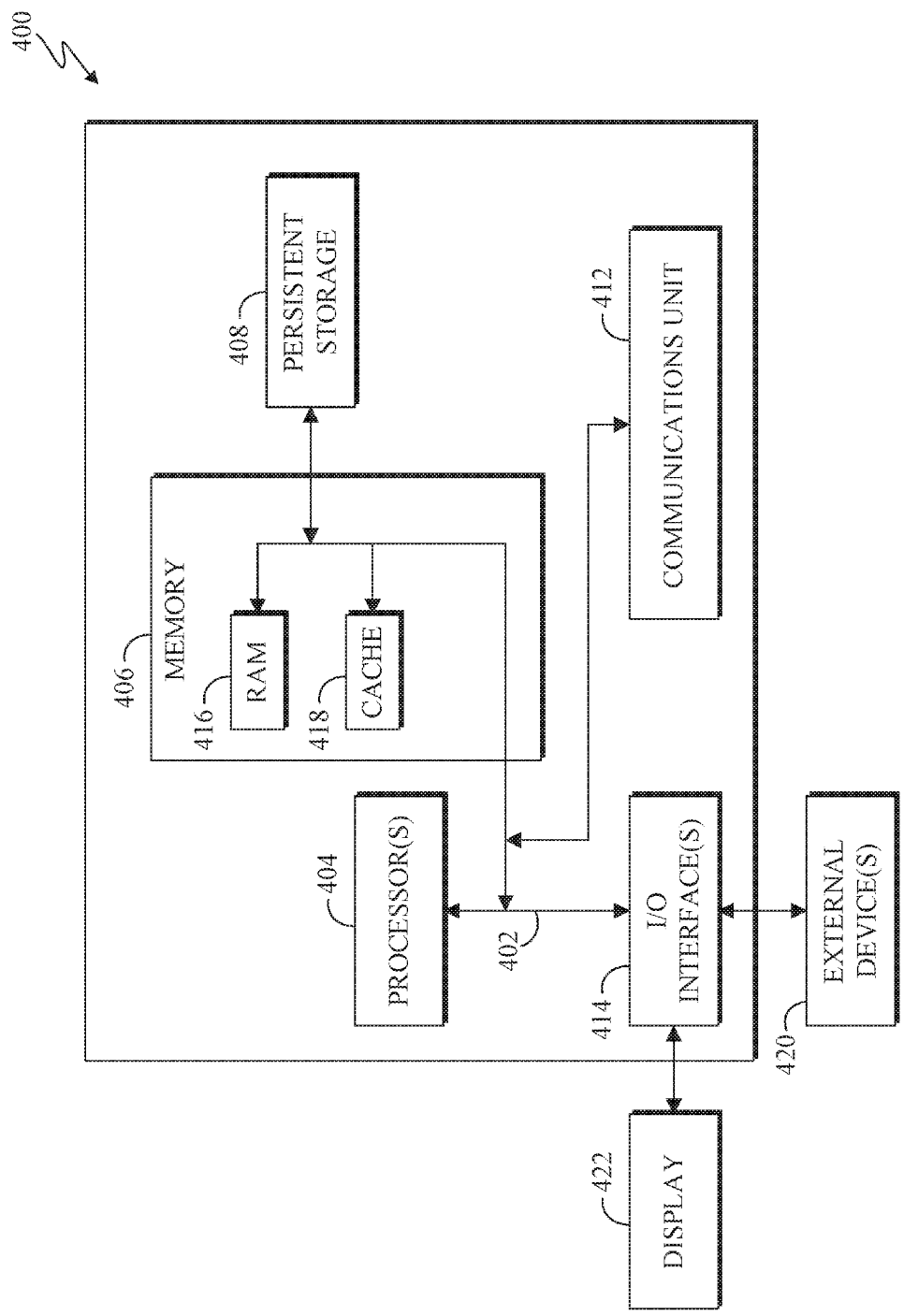
FIG. 4 is a block diagram depicting one example of a computing apparatus (i.e., computer) suitable for executing the methods disclosed herein.

FIG. 4 is a block diagram depicting components of a computer 400 suitable for executing the methods disclosed herein. It should be appreciated that FIG. 4 provides only an illustration of one embodiment and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In the depicted embodiment, memory 406 includes random access memory (RAM) 416 and cache memory 418. In general, memory 406 can include any suitable volatile or non-volatile computer readable storage media.

One or more programs may be stored in persistent storage 408 for execution by one or more of the respective computer processors 404 via one or more memories of memory 406. The persistent storage 408 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 408 via I/O interface(s) 414. I/O interface(s) 414 may also connect to a display 422. Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for splitting live register ranges, the computer program product comprising:
   a non-transitory computer readable storage medium and program instructions stored on the non-transitory computer readable storage medium, the program instructions comprising instructions for:
   providing, by a processor, a graph comprising a plurality of nodes including H nodes corresponding to instructions that use more symbolic registers than hardware registers present in a processor and L nodes corresponding to instructions that do not use more symbolic registers than hardware registers present in the processor;
   identifying, by the processor, one or more H pathways comprising one or more H nodes using a backwards data flow in the graph to determine the nodes in which each symbolic register is live when the symbolic register is used inside of a node;
   identifying, by the processor, an L pathway consisting of two or more L nodes using a depth first search;
   inserting, by the processor, register splitting instructions for each symbolic register that is live in both the one or more H pathways and the L pathway, wherein the register splitting instructions are inserted at a starting node of the one or more H pathways, and wherein inserting the register splitting instructions comprises providing a symbolic register r with a corresponding symbolic register r';
   inserting, by the processor, register merging instructions at an ending node of the one or more H pathways.

* * * * *